(12) United States Patent
Doe et al.

(10) Patent No.: US 12,387,489 B2
(45) Date of Patent: Aug. 12, 2025

(54) SYSTEMS AND METHODS FOR RESOURCE-OPTIMIZED MIXED REALITY USING USER-CENTRIC ADAPTIVE OBJECT DETECTION

(71) Applicant: Toyota Motor Engineering & Manufacturing North America, Inc., Plano, TX (US)

(72) Inventors: Daniel Doe, San Jose, CA (US); Dawei Chen, Milpitas, CA (US); Kyungtae Han, Palo Alto, CA (US)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 18/809,564

(22) Filed: Aug. 20, 2024

(65) Prior Publication Data

US 2025/0139966 A1  May 1, 2025

Related U.S. Application Data

(60) Provisional application No. 63/592,957, filed on Oct. 25, 2023.

(51) Int. Cl.
| | |
|---|---|
| *G06V 20/20* | (2022.01) |
| *G06F 3/01* | (2006.01) |
| *G06V 10/22* | (2022.01) |
| *G06V 10/25* | (2022.01) |
| *G06V 10/32* | (2022.01) |
| *G06V 20/56* | (2022.01) |

(52) U.S. Cl.
CPC .............. *G06V 20/20* (2022.01); *G06F 3/013* (2013.01); *G06V 10/235* (2022.01); *G06V 10/25* (2022.01); *G06V 10/32* (2022.01); *G06V 20/56* (2022.01)

(58) Field of Classification Search
CPC ...... G06V 20/20; G06V 10/235; G06V 10/25; G06V 10/32; G06V 20/56; G06F 3/013
See application file for complete search history.

(56) References Cited

U.S. PATENT DOCUMENTS

| | | |
|---|---|---|
| 11,032,590 B2 | 6/2021 | Shi et al. |
| 11,483,629 B2 | 10/2022 | Mate et al. |
| 11,623,653 B2 | 4/2023 | Liu et al. |

(Continued)

OTHER PUBLICATIONS

Sigcomm '18, Pengyuan Zhou et al., "ARVE: Augmented Reality Applications in Vehicle To Edge Networks", pp. 1-6, Aug. 21-23, 2018, Budapest, Hungary.

*Primary Examiner* — Abhishek Sarma
(74) *Attorney, Agent, or Firm* — Dinsmore & Shohl LLP

(57) ABSTRACT

System and method for reducing latency and bandwidth usage in reality devices include a reality device and one or more processors. The reality device includes a camera to operably capture a set of consequent frames of views external to a vehicle. The one or more processors are operable to monitor movements of one or more eyes of a user to obtain eye-tracking data using the reality device, identify an area of interest (AoI) in the frame based on the eye-tracking data, AoI history, or driving statistics of the user, crop the frame to obtain a reduced-size frame including the AoI in the frame, and transmit the reduced-size frame to an edge server for performing a task on behalf of the vehicle.

20 Claims, 7 Drawing Sheets

(56) References Cited

U.S. PATENT DOCUMENTS

| | | | |
|---|---|---|---|
| 2021/0243483 A1* | 8/2021 | Shi | H04N 21/21805 |
| 2022/0183208 A1* | 6/2022 | Sibley | G06V 20/56 |
| 2022/0385748 A1 | 12/2022 | Linsky et al. | |
| 2023/0108115 A1 | 4/2023 | Vrcelj et al. | |

* cited by examiner

SYSTEMS AND METHODS FOR RESOURCE-OPTIMIZED MIXED REALITY USING USER-CENTRIC ADAPTIVE OBJECT DETECTION

This application claims priority to provisional U.S. Application No. 63/592,957, filed Oct. 25, 2023, which is incorporated herein by reference in its entirety.

TECHNICAL FIELD

The present specification generally relates to mixed reality, augmented reality, and virtual reality and, more specifically, to mixed reality, augmented reality, and virtual reality using in networking.

BACKGROUND

Augmented reality (AR) technologies can be integrated into vehicle applications to enhance user interaction and mobility experiences. Remote AR data processing can release local AR computation usage and leverage cloud resources. Therefore, there is a need for a system and method for mixed reality (MR) applications that employ user centric adaptive image/frame data transmission to balance the use of server resources for intensive processing tasks while maintaining network performance and cost-effectiveness.

SUMMARY

In one embodiment, a system for reducing latency and bandwidth usage includes a reality device including a camera to operably capture a frame of a view external to a vehicle, and one or more processors. The one or more processors are operable to monitor movements of one or more eyes of a user to obtain eye-tracking data using the reality device, identify an area of interest (AoI) in the frame based on the eye-tracking data, AoI history, or driving statistics of the user, crop the frame to obtain a reduced-size frame including the AoI in the frame, and transmit the reduced-size frame to an edge server for performing a task on behalf of the vehicle.

In another embodiment, a method for reducing latency and bandwidth usage includes monitoring movements of one or more eyes of a user to obtain eye-tracking data using a reality device, identifying an area of interest (AoI) in a frame of a view external to a vehicle based on the eye-tracking data, AoI history, or driving statistics of the user, wherein the frame is captured by the reality device, cropping the frame to obtain a reduced-size frame including the AoI in the frame, and transmitting the reduced-size frame to an edge server for performing a task on behalf of the vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
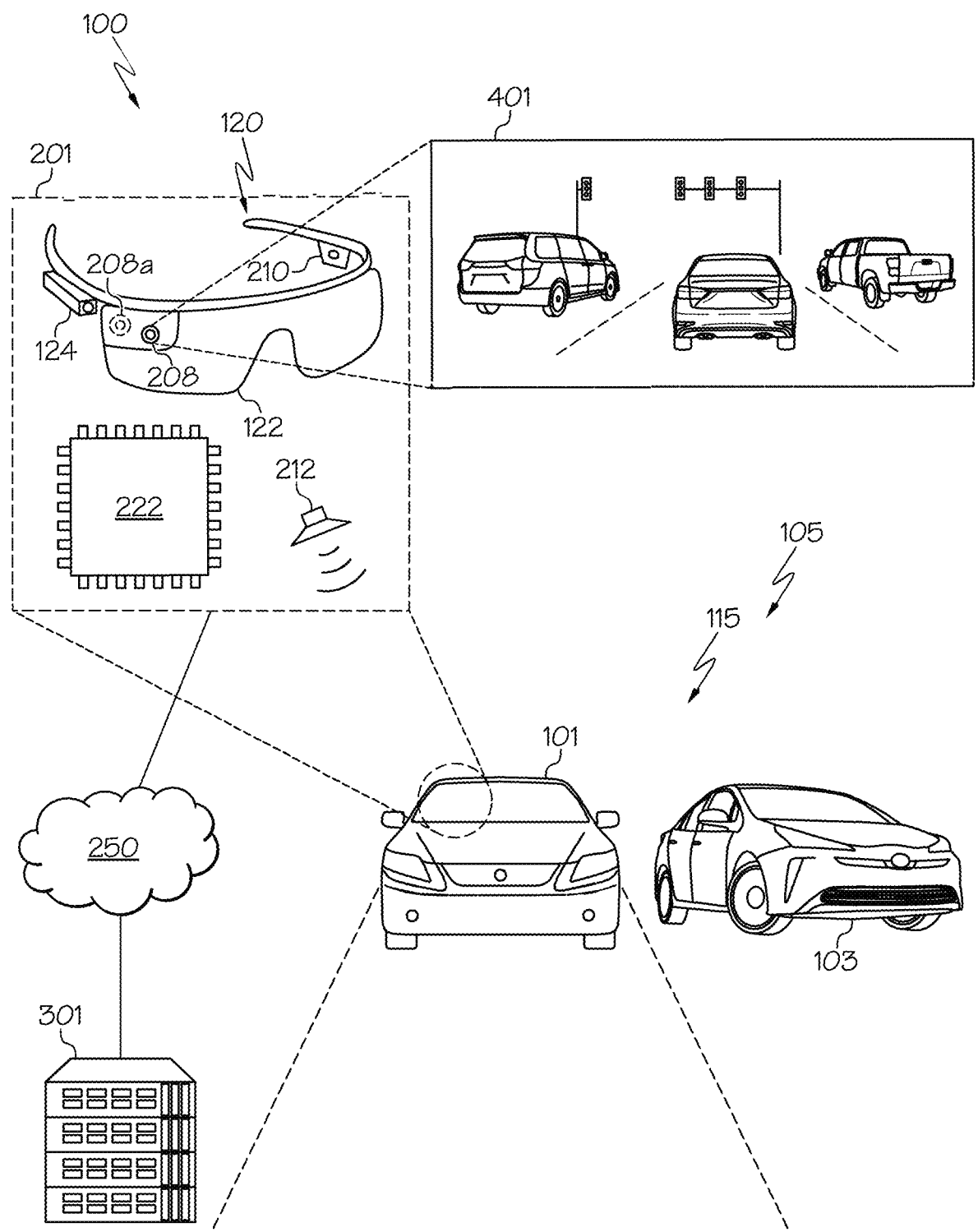
FIG. 1 schematically depicts an example system for reducing latency and bandwidth usage in mixed reality (MR) usage of the present disclosure, according to one or more embodiments shown and described herewith.

Mixed reality (MR) technology, such as augmented reality (AR) or virtual reality (VR), often relies on a combination of on-device and cloud-based processing for tasks like image classification and object recognition. The development of MR-integrated autonomous vehicles and AR technologies is revolutionizing mobility and user interaction experiences. Among the applications of AR technologies, real-time object detection is a desirable feature for MR applications in MR-integrated autonomous vehicles. These object detection tasks may involve context-sensitive driving, such as understanding the user's expectations when regularly looking at scenery, wildlife, or landmarks, providing real-time navigation assistance, and adjusting object detection based on the user's behavior and interactions with others in the vehicle.

Object detection tasks can be performed either locally on user devices or remotely on servers. Due to limitations in processing power, memory, and energy efficiency, processing MR data locally on reality devices may not always be feasible or desirable. Instead, server-based processing can manage computationally intensive tasks like object recognition, scene understanding, and spatial mapping. This remote processing leverages powerful cloud resources and advanced machine learning algorithms, allowing for real-time analysis and access to continually updated models and data.

Remote XR-based tasks must balance computational requirements and bandwidth usage. Current methods rely on transmitting full or substantial image frames to remote devices and servers, which is resource-intensive and leads to high bandwidth consumption and latency. These methods do not adapt to network conditions, resulting in delays and lags that degrade the user experience due to resource over-utilization. Further, information and outcomes may be transmitted between user reality devices and remote servers via wireless communication, where network congestion, signal strength, and interference from other devices can cause information latency. Accordingly, there exists a need to reduce latency and bandwidth usage in the MR devices through frame cropping based on a user-centric adaptive object detection.

To address the issues of latency and bandwidth usage, the disclosed system and method transmit cropped frames with selective object detection based on user-centric adaptive object detection for optimal resource utilization. By dynamically adjusting the scope of object detection based on the user's eye and head movements and focusing only on predetermined relevant areas or objects, the disclosed system and method enables selective object detection, creates a user-centric, resource-efficient MR experience, and reduces data transmission to improve the system overall performance. The system for reducing latency and bandwidth usage includes a reality device including a camera to operably capture a frame of a view external to a vehicle. The system may monitor movements of one or more eyes of a user to obtain eye-tracking data using the reality device, identify an area of interest (AoI) in the frame based on the eye-tracking data, AoI history, or driving statistics of the user, crop the frame to obtain a reduced-size frame including the AoI in the frame, and transmit the reduced-size frame to an edge server for performing a task on behalf of the vehicle.

Embodiments of systems and methods disclosed herein include a reality device including a camera and a processor. The reality device may be an AR device, such as an AR headset, a VR device, or a MR device. The camera operably images an environment around a vehicle, such as an automatic vehicle, and captures a set of frames. The processor is operable to monitor a user's eye movement using the MR device, identify AoI in the frame based on eye-tracking data, AoI history, or driving statistics of the user, and crop the frame to obtain a reduced-size frame including the AoI in the frame, and transmit the reduced-size frame to an edge server.

In embodiments, the system may adjust object detection based on the user's behavior during interactions with other passengers in the vehicle. For example, the system can temporarily prioritize object detection in front of the vehicle when the user is turning her head to talk to a passenger. The user may further interact with the environment through the MR device, such as an AR headset, where the user's AoI is identified based on eye-tracking data. The user's experience is enhanced as object detection is performed on the user's AoI, reducing latency and offering a more immersive and responsive mixed-reality experience.

Various embodiments of the methods and systems for reducing latency and bandwidth usage in MR applications through user-centric adaptive object detection are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Referring now to Figures, FIG. 1 schematically depicts an example user-centric adaptive object detection system 100. The user-centric adaptive object detection system 100 includes components, devices, and subsystems based on MR-related and data-transmission-based technologies for information deployments during vehicle driving experiences. The MR technologies provide augmented and virtual reality experiences to one or more users (e.g., drivers and/or passengers) of an ego vehicle 101 to enhance situational awareness and entertainment during driving. The data transmission allows a real-time information flow to deliver information to the users in a timely and effective manner. Particularly, the user-centric adaptive object detection system 100 may capture an image or a frame 401 of environment 105 surrounding the ego vehicle 101 and transfer the image or the frame 401 to a server 301, such as an edge server, for task performance via wireless communication 250. The user-centric adaptive object detection system 100 may receive data transmitted from the server 301 and further integrate the received data into the MR function deployments.

The user-centric adaptive object detection system 100 may include one or more reality devices 201. The reality devices 201 are the local devices and components used by a user for the MR experience, such as while driving an autonomous vehicle. In some embodiments, the reality devices 201 may perform any MR-related functions to interact with the user to provide an immersive MR experience, without any assistance of external devices or cloud-based services. In some embodiments, the reality devices 201 may collaborate with external devices and services, such as the wireless communication 250 and the server 301, to enhance the MR experience for the user when local devices may be insufficient to perform the desirable tasks or provide desirable information.

Figure 2:
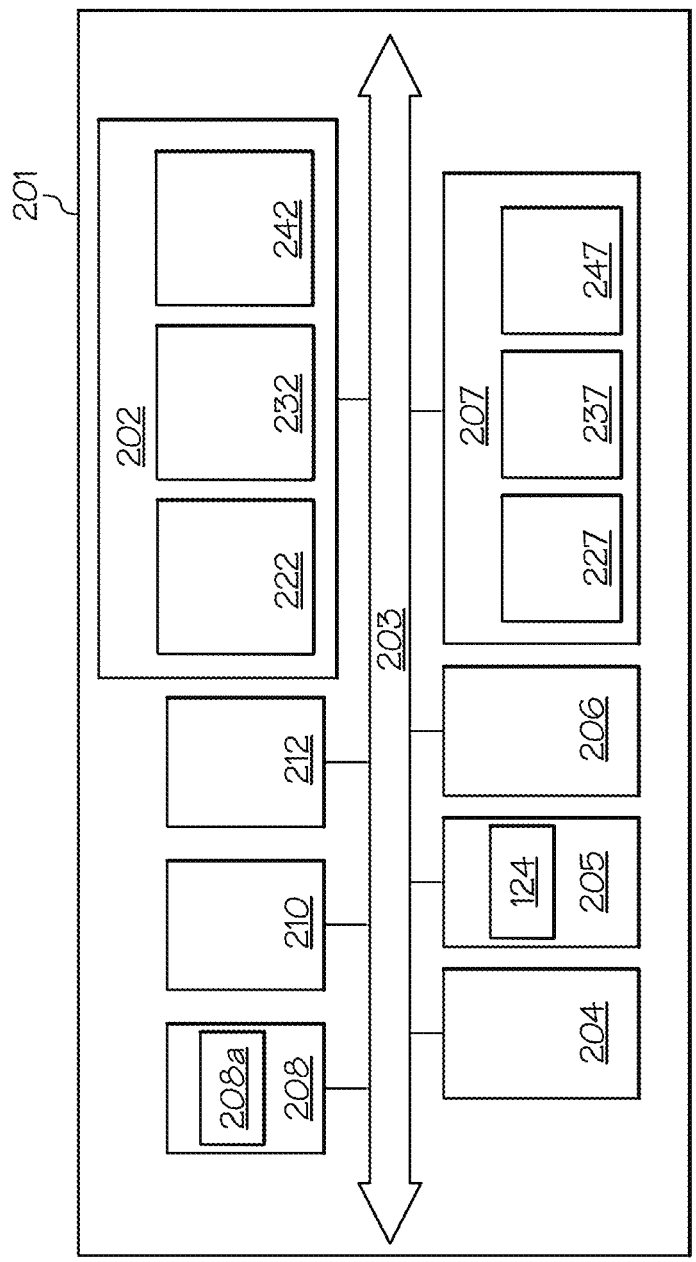
FIG. 2 schematically depicts example components of reality devices of the present disclosure, according to one or more embodiments shown and described herein.

In some embodiments, the reality devices 201 may include, without limitation, a virtual head unit 120, a computation offloading module 222, one or more sensors, such as a vision sensor 208, an eye-tracking sensor 208a, and a head-tracking sensor 210, a rendering device 124, a sound sensor 212, or a combination thereof. The eye-tracking sensor 208a may capture information regarding the user's eyes, such as user eye movements. The vision sensor 208 may operably capture environmental images or videos in consequence of one or more frames 401 of environment 105 around the user and/or the ego vehicle 101. The reality devices 201 may further include the network interface hardware 206 (e.g., as illustrated in FIG. 2) that can be communicatively coupled to a wireless communication 250 to transmit data to and/or from external computing resources, such as the server 301.

In some embodiments, the virtual head unit 120 may include, without limitations, the vision sensor 208, glasses 122, the eye-tracking sensor 208a, the head-tracking sensor 210, and the rendering device 124. The eye-tracking sensor 208a may operably track the user's eye movements, such as, without limitation, positions, angles, or pupil sizes of the one or more eyes of the user. The eye-tracking sensor 208a may enable the user-centric adaptive object detection system 100 to understand where the user is looking for gaze-based interaction with virtual objects, adjust the level of operation of the system to improve performance and reduce computational load, and analyze the user's attention and interest. The head-tracking sensors 210 may track the user's head movement. The head-tracking sensor 210 may allow the user-centric adaptive object detection system 100 to understand the position and orientation of the user's head in physical space. The rendering devices 124, such as one or more projectors, may superimpose images or texts onto the user's eyes or an immersive screen, such as a see-through display or the glasses 122, to render the images or texts into the real-world view of the user.

In some embodiments, the vision sensor 208 may be operable to acquire image and video data, such as one or more frames 401, of the environment 105 surrounding the reality devices 201. The vision sensor 208 may include the eye-tracking sensor 208a operable to acquire images and video data of the user's eyes. The vision sensor 208 may be, without limitation, an RGB camera, a depth camera, an infrared camera, a wide-angle camera, an infrared laser camera, or a stereoscopic camera. The vision sensor 208 may be equipped, without limitation, on a smartphone, a tablet, a computer, a laptop, the virtual head unit 120, or on the ego vehicle 101. In operation, the vision sensor 208 may continuously capture one or more frames 401 of the environment 105 surrounding the reality devices 201 or the ego vehicle 101.

In some embodiments, the user-centric adaptive object detection system 100 may include one or more displays. The display may be equipped, without limitation, on the ego vehicle 101, a touchscreen, a smartphone, a tablet, a computer, a laptop, or the virtual head unit 120. The captured frames or processed frames marked with detected objects with or without related information may be displayed on the displays.

In some embodiments, the vision sensor 208, the eye-tracking sensor 208a, the head-tracking sensor 210, and the rendering device 124 may be included in the ego vehicle 101. For example, the vision sensor 208, the eye-tracking sensor 208a, the head-tracking sensor 210, or the rendering device 124 may be mounted on a windshield, a steering wheel, a dashboard, or a rearview mirror of the ego vehicle 101.

In some embodiments, the user-centric adaptive object detection system 100 may include an interaction device. The interaction device may provide communication between the user and the virtual world. The interaction device may include a tangible object, such as, without limitations, a marker, a physical model, a sensor, a wearable motion-tracking device, or a smartphone.

In some embodiments, the user-centric adaptive object detection system 100 may include a sound sensor 212. The sound sensor 212 may operably determine the volume, pitch, frequency, and/or features of sounds in the ego vehicle 101 or around the virtual head unit 120. The sound sensor 212 may be embedded in the virtual head unit 120 or inside the ego vehicle 101 to detect and process the sound waves that are produced when the user or a passenger speaks in the ego vehicle 101. The user-centric adaptive object detection system 100 may include a speech processor to convert the sound waves into human language and further recognize the meaning within, such as user commands.

In some embodiments, the computation offloading module 222 may include one or more processors communicatively coupled to other reality devices. The computation offloading module 222 may receive data generated by one or more other reality devices 201, such as the image or video data generated by the vision sensor 208 and the eye-tracking sensor 208a, the sound data generated by the sound sensor 212, and the motion data generated by the head-tracking sensor 210. The computation offloading module 222 may further inquire and receive information on external hardware and devices, such as the wireless communication 250 and the server 301. The computation offloading module 222 may determine a real-time area of interest (AoI) 402 (e.g., as illustrated in FIG. 4B) of the user based on the eye-tracking data and the motion data. The computation offloading module 222 may crop the frame 401 to generate reduced-size frame 403 (e.g., as illustrated in FIG. 4B) based on the AoI 402 in the frame 401 and send the frames 401 or the reduced-size frame 403 to the server 301.

In some embodiments, the computation offloading module 222 may include an artificial intelligence (AI) module including one or more AI algorithms. The AI module may be used to monitor AoI 402 of the user corresponding to each frame. The AI module may include a deep reinforcement learning function. The deep reinforcement learning function may include determining the AoI 402 of the frame 401, based on eye-tracking data, historical area of interest data 227 (e.g., as illustrated in FIG. 2), driving statistics of the user, or a combination thereof. The AI algorithms may be trained based on the rewards of correct AoI detection that meets the user's demands, reduced bandwidth, and penalty for incorrect AoI detection and missed object detection.

The user-centric adaptive object detection system 100 may include one or more processors (e.g., as illustrated in FIG. 2). The processors may be included, without limitation, in a controller (such as a computer, a laptop, a tablet, or a smartphone), the virtual head unit 120, a server, or a third-party electronic device.

The user-centric adaptive object detection system 100 may include the ego vehicles 101. In embodiments, each of the ego vehicles 101 may be an automobile or any other passenger or non-passenger vehicle such as, for example, a terrestrial, aquatic, and/or airborne vehicle. Each of the ego vehicles 101 may be an autonomous vehicle that navigates its environment with limited human input or without human input. Each of the ego vehicle 101 may drive on a road 115, where one or more non-ego vehicles 103 may share the road 115 with the ego vehicle 101. Each of the vehicles 101 and 103 may include actuators for driving the vehicle, such as a motor, an engine, or any other powertrain. The vehicles 101 and 103 may move or appear on various surfaces, such as, without limitation, roads, highways, streets, expressways, bridges, tunnels, parking lots, garages, off-road trails, railroads, or any surfaces where the vehicles may operate.

In embodiments, the vision sensors 208 may continuously capture frames of environment 105 surrounding the user and the ego vehicle 101, such as a non-ego vehicles 103 near the ego vehicle 101, objects in the environment 105 surrounding the ego vehicle, such as buildings, traffic lights, places of interests, contextual information, such as weather information, a type of the road on which the ego vehicle 101 is driving, a surface condition of the road 115 on which the ego vehicle 101 is driving, and a degree of traffic on the road 115 on which the ego vehicle 101 is driving. The environmental data may include buildings and constructions near the road 115, weather conditions (e.g., sunny, rain, snow, or fog), road conditions (e.g., dry, wet, or icy road surfaces), traffic conditions, road infrastructure, obstacles (e.g., non-ego vehicles 103 or pedestrians), lighting conditions, geographical features of the road 115, and other environmental conditions related to driving on the road 115.

Figure 5:
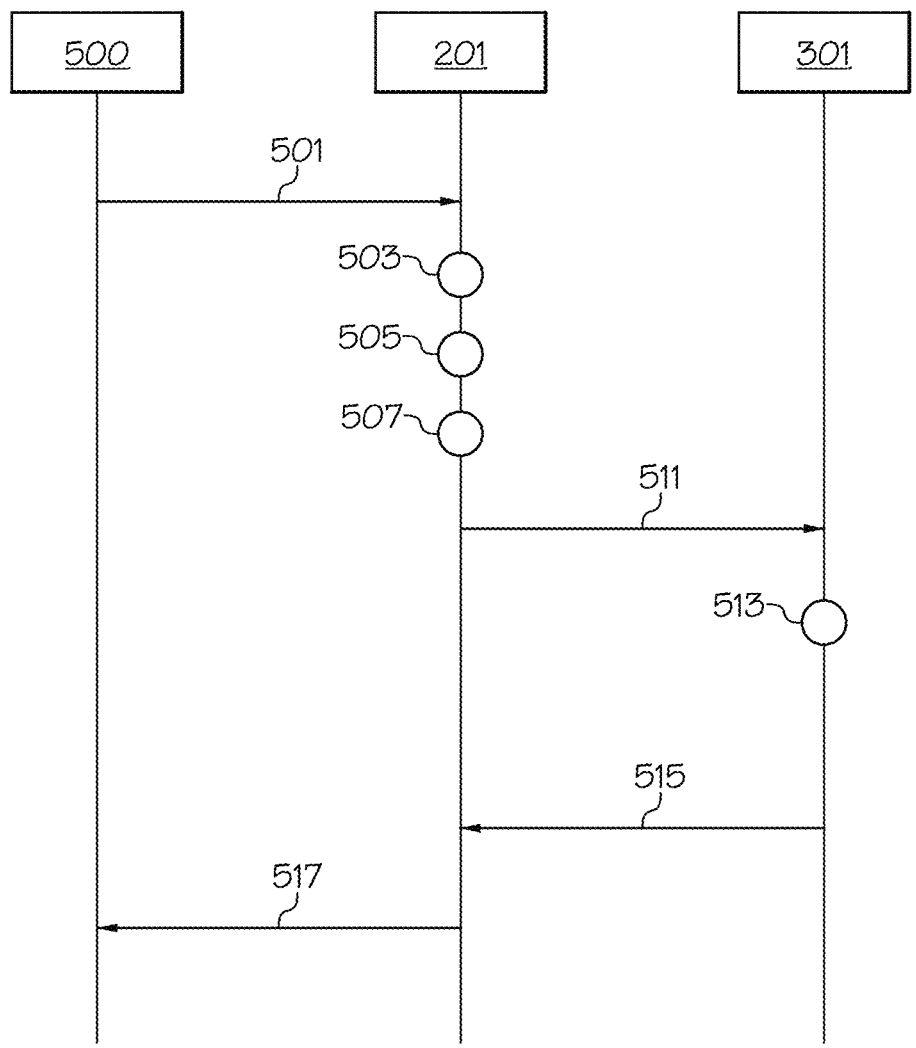
FIG. 5 depicts a sequence diagram for performing cropped frame transmission in MR usage of the present disclosure, according to one or more embodiments shown and described herein.

In embodiments, the reality devices 201 and/or the ego vehicle 101 may send a request for task performance and one or more frames 401 or reduced-size frame 403 (e.g., as illustrated in FIG. 5) to the one or more servers 301. The reality devices 201 and/or the ego vehicle 101 may include a network interface hardware 206 and communicate with the server 301 via wireless communications 250. The reality devices 201 and/or ego vehicle 101 may transmit, without limitation, the frame 401 or the reduced-size frame 403, environmental data, sensory data, real-time driver reaction time, and user driving statistics associated with the user. In some embodiments, the ego vehicle 101 may communicate with the server 301 using a smartphone, a computer, a tablet, or a digital device that requires data processing.

In embodiments, the server 301 may be any device and/or edge server remotely connected to the reality devices 201. The server 301 may include, without limitation, one or more of cloud servers, smartphones, tablets, telematics servers, fleet management servers, connected car platforms, application servers, Internet of Things (IoTs) servers, or any server with the capability to transmit data with the reality devices 201. The server 301 may include server network interface hardware 306 and communicate with the reality devices 201, the ego vehicles 101, and other servers via wireless communications 250. The server 301 may include an object detection module 322 operable to analyze uploaded images and video frames to identify any objects of interest within the images and video frames and generate object detection data to send back to the reality devices 201 and/or the ego vehicle 101.

The wireless communication 250 may connect various components, the reality devices 201, the ego vehicle 101, and the server 301 of the user-centric adaptive object detection system 100, and allow signal transmission between the various components, the reality devices 201, the ego vehicles, and/or the server 301 of the user-centric adaptive object detection system 100. In one embodiment, the wireless communications 250 may include one or more computer networks (e.g., a personal area network, a local area network, or a wide area network), cellular networks, satellite networks, a global positioning system, and combinations thereof. Accordingly, the reality devices 201, the ego vehicles 101, and the servers 301 can be communicatively coupled to the wireless communications 250 via a wide area network, a local area network, a personal area network, a cellular network, or a satellite network, etc. Suitable local area networks may include wired Ethernet and/or wireless technologies such as Wi-Fi. Suitable personal area networks may include wireless technologies such as IrDA, Bluetooth®, Wireless USB, Z-Wave, ZigBee, and/or other near-field communication protocols. Suitable cellular networks include, but are not limited to, technologies such as LTE, WiMAX, UMTS, CDMA, and GSM.

Figure 3:
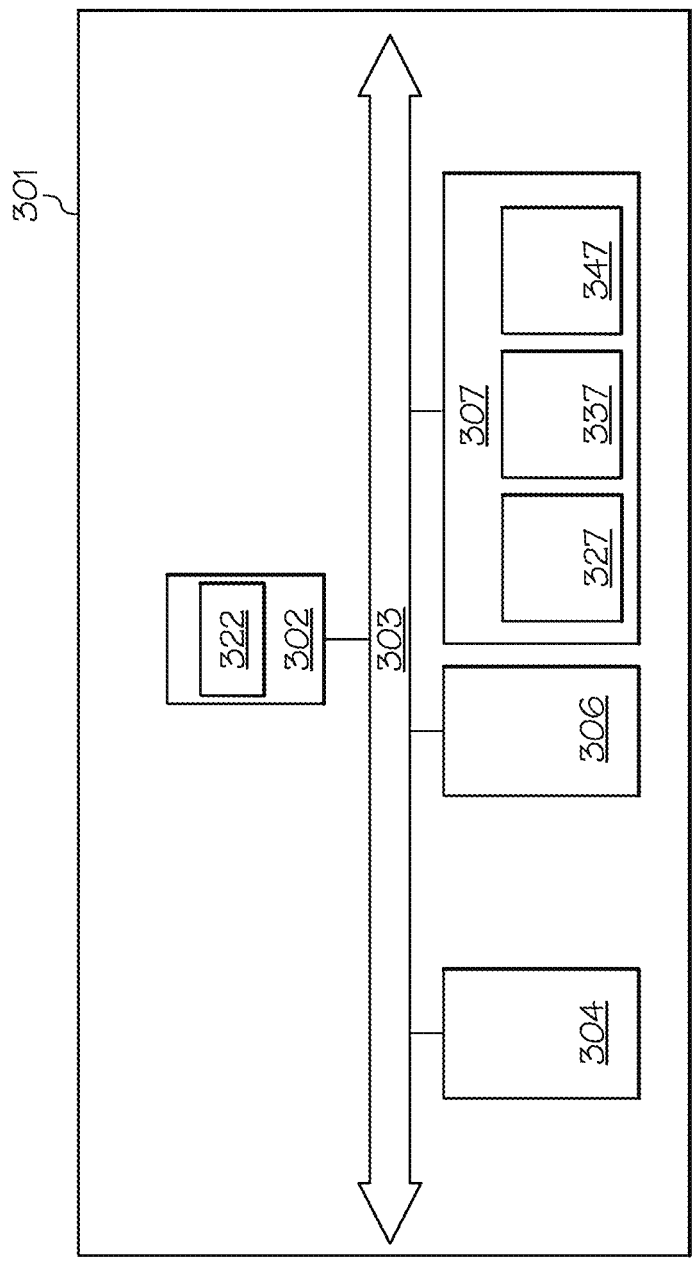
FIG. 3 schematically depicts example components of server of the present disclosure, according to one or more embodiments shown and described herein.

FIGS. 2 and 3 schematically depict example components of the user-centric adaptive object detection system 100. The user-centric adaptive object detection system 100 may include the one or more reality devices 201, the ego vehicle 101, and/or the server 301. While FIG. 2 depicts one reality device 201, more than one reality devices 201 may be included in the user-centric adaptive object detection system 100.

Referring to FIG. 2, the reality device 201 may include one or more processors 204. Each of the one or more processors 204 may be any device capable of executing machine-readable and executable instructions. The instructions may be in the form of a machine-readable instruction set stored in data storage component 207 and/or the memory component 202. Accordingly, each of the one or more processors 204 may be a controller, an integrated circuit, a microchip, a computer, or any other computing device. The one or more processors 204 are coupled to a communication path 203 that provides signal interconnectivity between various modules of the system. Accordingly, the communication path 203 may communicatively couple any number of processors 204 with one another, and allow the modules coupled to the communication path 203 to operate in a distributed computing environment. Specifically, each of the modules may operate as a node that may send and/or receive data. As used herein, the term "communicatively coupled" means that coupled components are capable of exchanging data signals with one another such as, for example, electrical signals via a conductive medium, electromagnetic signals via air, optical signals via optical waveguides, and the like.

Accordingly, the communication path 203 may be formed from any medium that is capable of transmitting a signal such as, for example, conductive wires, conductive traces, optical waveguides, or the like. In some embodiments, the communication path 203 may facilitate the transmission of wireless signals, such as WiFi, Bluetooth®, Near Field Communication (NFC), and the like. Moreover, the communication path 203 may be formed from a combination of mediums capable of transmitting signals. In one embodiment, the communication path 203 comprises a combination of conductive traces, conductive wires, connectors, and buses that cooperate to permit the transmission of electrical data signals to components such as processors, memories, sensors, input devices, output devices, and communication devices. Accordingly, the communication path 203 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal wave, triangular wave, square-wave, vibration, and the like, capable of traveling through a medium.

The one or more memory components 202 may be coupled to the communication path 203. The one or more memory components 202 may comprise RAM, ROM, flash memories, hard drives, or any device capable of storing machine-readable and executable instructions such that the machine-readable and executable instructions can be accessed by the one or more processors 204. The machine-readable and executable instructions may comprise one or more logic or algorithms written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory components 202. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 204 along with the one or more memory components 202 may operate as a controller or an electronic control unit (ECU) for the reality devices 201 and/or the ego vehicle 101.

The one or more memory components 202 may include the computation offloading module 222, a user command module 232, and an eye/head tracking module 242. The data storage component 207 stores historical eye/head tracking data 237, historical area of interest data 227, and historical user interaction data 247. The historical user interaction data 247 may include, without limitations, historical user driving data, historical user attention data, historical user voice command data, and historical user driving data.

The reality devices 201 may include the input/output hardware 205, such as, without limitation, a monitor, keyboard, mouse, printer, camera, microphone, speaker, and/or other device for receiving, sending, and/or presenting data. The input/output hardware 205 may include the rendering device 124. The rendering devices 124 is coupled to the communication path 203 and communicatively coupled to the one or more processors 204. The rendering device 124 may include, without limitations, a projector or a display. In some embodiments, the rendering device 124 may display digital content directly onto physical surfaces, such as the glass 122. For example, the rendering device may overlay navigation instructions onto the glass 122 or the road 115 while driving or display additional information regarding objects in the environment 105. In some embodiments, the rendering device 124 may project images directly onto the user's retina to create a blend of virtual and real-world visuals.

The reality device 201 may include network interface hardware 206 for communicatively coupling the reality device 201 to the server 301. The network interface hardware 206 can be communicatively coupled to the communication path 203 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. The network interface hardware 206 of the reality devices 201 and/or the ego vehicle 101 may transmit its data to the server 301 via the wireless communication 250. For example, the network interface hardware 206 of the reality devices 201 and/or the ego vehicle 101 may transmit original or processed frames 401 and other task related data to the server 301, and receive processed information, task performance results, and any relevant data, such as, without limitation, vehicle data, image and video data, object detection data, and the like from the server 301.

In some embodiments, the vision sensor 208 is coupled to the communication path 203 and communicatively coupled to the processor 204. The reality device 201 and/or the ego vehicle 101 may include one or more vision sensors 208. The vision sensors 208 may be used for capturing images or videos of the environment 105 around the user and/or the ego vehicles 101. In some embodiments, the one or more vision sensors 208 may include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain rough depth and speed information for the view of the reality devices 201 and/or the ego vehicle 101. The one or more vision sensors 208 may include a forward-facing camera installed in the reality devices 201 and/or the ego vehicle 101. The one or more vision sensors 208 may be any device having an array of sensing devices capable of detecting radiation in an ultraviolet wavelength band, a visible light wavelength band, or an infrared wavelength band. The one or more vision sensors 208 may have any resolution. In some embodiments, one or more optical components, such as a mirror, fish-eye lens, or any other type of lens may be optically coupled to the one or more vision sensors 208. In embodiments described herein, the one or more vision sensors 208 may provide image data to the one or more processors 204 or another component communicatively coupled to the communication path 203. In some embodiments, the one or more vision sensors 208 may also provide navigation support. That is, data captured by the one or more vision sensors 208 may be used to autonomously or semi-autonomously navigate a vehicle.

In some embodiments, the vision sensors 208 may include the eye-tracking sensor 208a. The eye-tracking sensor 208a may be operable to track the movements of the one or more eyes of the user and generate the eye-tracking data. The eye-tracking data may include user focus points, gaze fixations of each corresponding focus point, saccades between gaze fixations, scan paths of gaze fixations and saccades, and pupil dilation. The eye-tracking sensor 208a may be a remote eye-tracking sensor positioned at a distance to track the user's eye movements without needing physical contact with the user, and/or a head-mounted eye-tracking sensor equipped on the virtual head unit 120 or a place inside the ego vehicle 101 that directly tracks eye movements. The eye-tracking sensor 208a may be an infrared-based eye-tracker that uses infrared light to detect the reflection from the retina and cornea to calculate the point of gaze. For example, the eye-tracking sensor may include an infrared laser source operable to illuminate the user eyes and an eye camera operable to capture the eye-tracking data. The eye-tracking sensor 208a may be a video-based eye-tracker that uses high-speed cameras to capture eye movements to determine gaze direction. The eye-tracking sensor 208a may be an electrooculography that measures the electrical potential around the user's eyes to infer movement and position.

In some embodiments, the head-tracking sensor 210 is coupled to the communication path 203 and communicatively coupled to the processor 204. The head-tracking sensor 210 may include an inertial sensor, an optical sensor, a magnetic sensor, an acoustic sensor, or a combination thereof. The head-tracking sensor 210 may operably monitor and measure the position and movement of the user's head. For example, in one embodiment, the head-tracking sensor 210 may include accelerometers and/or gyroscopes in the virtual head unit 120 to monitor the user's head movements. In another embodiment, the head-tracking sensor 210 may be a camera attached to the ego vehicle 101 to track the position and movement of the user's head.

In some embodiments, the sound sensor 212 is coupled to the communication path 203 and communicatively coupled to the processor 204. The sound sensor 212 may be one or more sensors coupled to the user-centric adaptive object detection system 100 for determining the volume, pitch, frequency, and/or features of sounds in the ego vehicle 101 or around the virtual head unit 120. The sound sensor 212 may include a microphone or an array of microphones that may include mechanisms to filter background noise, such as engine sounds or beamforming. The sound sensor 212 may be embedded in the virtual head unit 120 or inside the ego vehicle 101 to detect and process the sound waves that are produced when a person speaks in the vehicle. For example, the sound sensor 212 may be located in the ceiling, dashboard, or center console of the ego vehicle 101. The sound sensor 212 may be connected to one or more microphones picking up the soundwaves. The soundwaves may be then processed by the user-centric adaptive object detection system 100 which converts the soundwaves into digital signals.

Referring to FIG. 3, the server 301 includes one or more processors 304, one or more memory components 302, data storage component 307, server network interface hardware 306, and a local interface 303. The one or more processors 304 may be a controller, an integrated circuit, a microchip, a computer, or any other computing device. The one or more memory components 302 may comprise RAM, ROM, flash memories, hard drives, or any device capable of storing machine-readable and executable instructions such that the machine-readable and executable instructions can be accessed by the one or more processors 304. The one or more memory components 302 may include an object detection module 322. The data storage component 307 may store historical object detection data 327, historical user preference data 337, and object information data 347.

In some embodiments, the object detection module 322 may, after receiving an object detection task request and the frame 401 or the reduced-size frame 403 from the reality devices 201 or the ego vehicle 101, normalize, resize, and adjust the received selected frames, use one or more object detection models, such as You Only Look Once (YOLO), Single Shot Multbox Detector (SSD), Region-based Convolutional Neural Networks (R-CNN) to generated model outputs, such as, without limitation, bounding boxes (e.g., coordinates of retangles around detected objects), class labels (e.g., type of the object), and confidence scores for each detected object. In some embodiments, the object detection module 322 may further conduct non-maximum suppression to eliminate redundant overlapping boxes and apply a confidence score threshold to filter out low-confidence detections. The generated detection data, such as [{"Boxes": [coordinate point 1, coordinate point 2, coordinate point 3, coordinate point 4], "Confidence": [a value between 0 and 1], "Classes": "object type"}], for each detected object, may be sent to the reality devices 201. The object detection and detection data transmission may consider other factors, such as the user's preference and past object detection.

Referring back to FIGS. 2 and 3, each of the reality device modules and the server modules, such as the computation offloading module 222, the eye/head tracking module 242, the user command module 232, and the object detection module 322, may include one or more machine learning algorithms. The reality device modules and the server modules may be trained and provided with machine-learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (Sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In ML applications, new inputs may be provided (such as the generated one or more outputs) to the ANN model as training data to continue to improve accuracy and minimize error of the ANN model. The one or more ANN models may utilize one-to-one, one-to-many, many-to-one, and/or many-to-many (e.g., sequence-to-sequence) sequence modeling. The one or more ANN models may employ a combination of artificial intelligence techniques, such as, but not limited to, Deep Reinforcement Learning (DRL), Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in the field of machine learning, for example, is a class of deep, feed-forward ANNs applied for audio analysis of the recordings. CNNs may be shift or space-invariant and utilize shared-weight architecture and translation. Further, each of the various modules may include a generative artificial intelligence algorithm. The generative artificial intelligence algorithm may include a general adversarial network (GAN) that has two networks, a generator model and a discriminator model. The generative artificial intelligence algorithm may also be based on variation autoencoder (VAE) or transformer-based models.

Figure 4A:
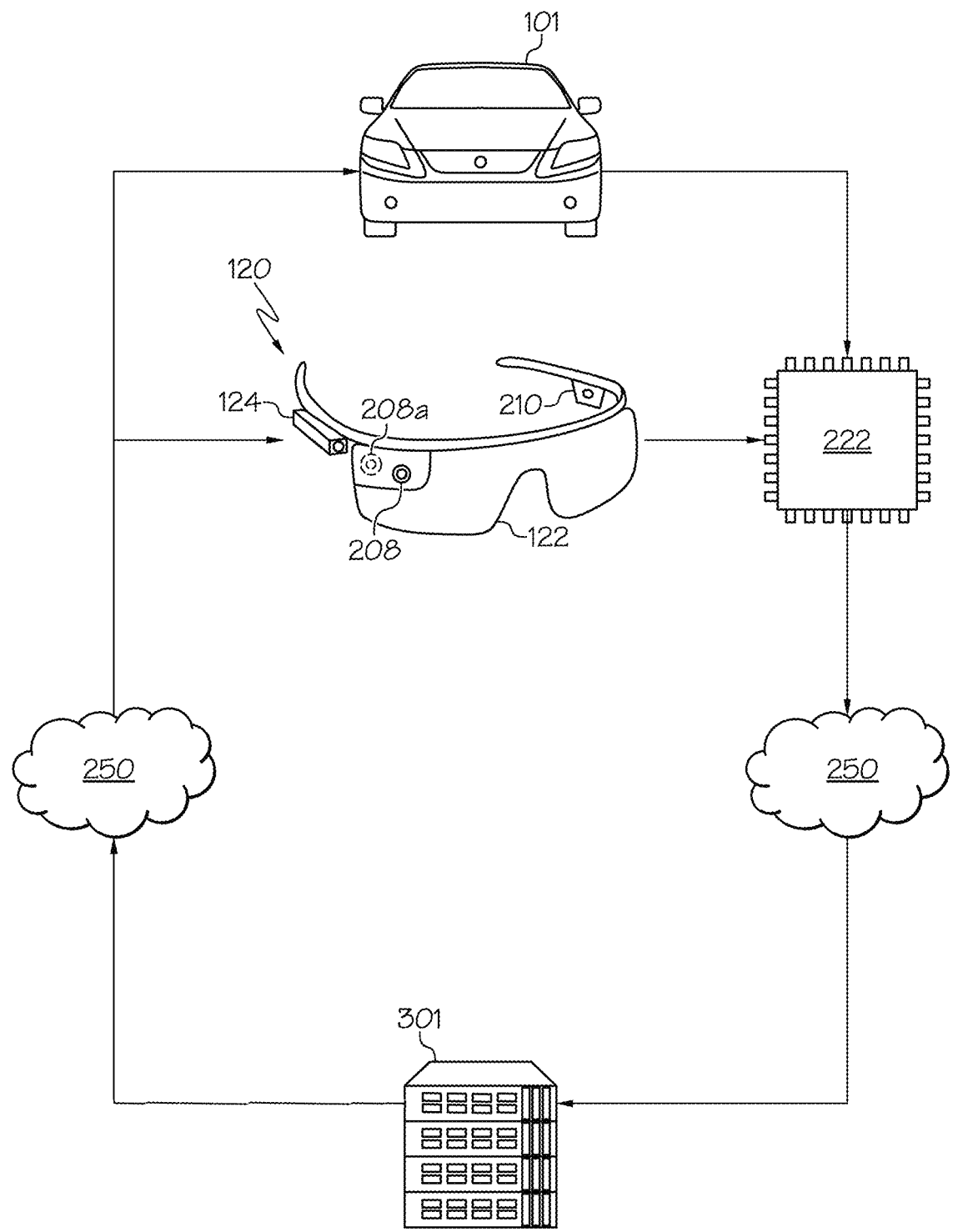
FIG. 4A schematically depicts an example system for performing cropped frame transmission in MR usage of the present disclosure, according to one or more embodiments shown and described herein FIG. 4B schematically depicts a flowchart for performing cropped frame transmission in MR usage of the present disclosure, according to one or more embodiments shown and described herein.
Figure 4B:
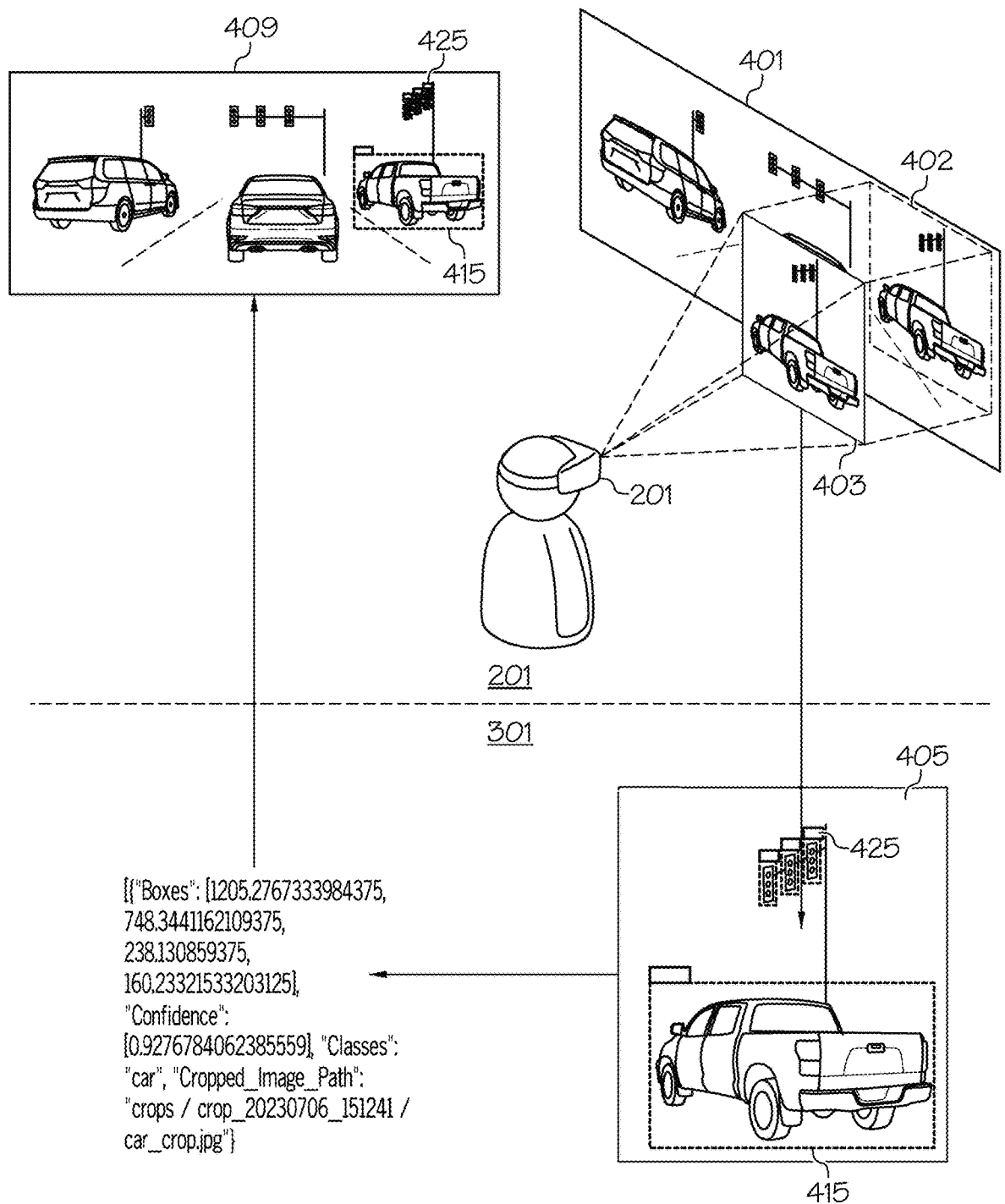

Referring to FIGS. 4A and 4B, the user-centric adaptive object detection system 100 for reducing latency and bandwidth usage is depicted. The user-centric adaptive object detection system 100 may include one or more reality devices 201, including, without limitations, the vision sensor 208 operably capturing a set of consequent frames 401 of views external to the ego vehicle 101. The eye/head tracking module 242 may determine the AoI 402 of the user. The computation offloading module 222 may generate the reduced-size frame 403 based on the AoI 402 of the frame 401. The user-centric adaptive object detection system 100 may transmit the reduced-size frame 403 to the server 301, such as an edge server, a central server, a cloud server, or the like, for performing a task on behalf of the ego vehicle 101.

In some embodiments, in operation, the user may wear the one or more reality devices 201, such as the virtual head unit 120 while using or driving the ego vehicle 101. The vision sensor 208 on the virtual head unit 120 or the ego vehicle 101 may continuously capture images and/or image frames 401 of the environment 105 around the user and/or the ego vehicle 101. The computation offloading module 222 may determine whether to transfer any captured frames 401 to the server 301 for image processing tasks, such as object detection, considering the local computing resources and efficiency, and the remote devices and network resources and efficiency.

In some embodiments, the computation offloading module 222 may crop the frame 401 based on the user's AoI 402, for example, using eye-tracking data and head-tracking data. The reality devices 201 may collect the eye-tracking data and the head-tracking data using the eye-tracking sensor 208a and the head-tracking sensor 210. The vision sensor 208 may work with the eye/head tracking module 242 and the user command module 232 to determine the states of the generated video frames and focus area. The eye/head tracking module 242 may utilize eye-tracking data from the eye-tracking sensor 208a and head-tracking data from the head-tracking sensor 210 to assess the user's focus area in the current frame and the interest in objects within the current frame. The eye/head tracking module 242 may determine the AoI 402 based on the eye movements, such as, without limitations, positions, angles, or pupil sizes of the one or more eyes of the user. The eye/head tracking module 242 may estimate the level of interest by analyzing eye movement patterns such as, without limitation, user focus points, gaze fixations of each corresponding focus point, saccades between gaze fixations, scan paths of gaze fixations and saccades, pupil dilation fixation, skipping, regression, alongside head orientation, head movements, and head stability.

In some embodiments, the computation offloading module 222 may identify the AoI 402 in the frame based on the user's gaze-based interaction with virtual objects. The gaze-based interaction may include duration and frequency of gaze to the virtual objects. For example, the eye/head tracking module 242 may determine the AoI 402 in the current frame based on first fixation time and duration, number of fixations, number of visits, and total time spent. In some embodiments, the computation offloading module 222 may identifying the AoI 402 based on driving statistics of the user. For example, the computation offloading module 222 may collect driving sensory data to determine driving events, such as acceleration, deceleration, break/stop, and the like, and correlate the user eye movement with the driving events to identify the AoI 402 in the frame 401.

In embodiments, after determining the AoI 402 in the frame 401, the computation offloading module 222 may crop the frame 401 according to the AoI 402 to generate the reduced-size frame 403, and further send the reduced-size frame 403 to the server for task performance, such as object detection.

In embodiments, the algorithms in the various modules in determining the reduced-size frame 403 may be pre-trained, tuned, and continuously trained via machine-learning functions within. For example, the computation offloading module 222 may be a deep reinforcement learning-based (DRL-based) frame selector. The computation offloading module 222 The DRL may use neural networks to approximate the mapping between network states, user states (e.g., AoI 402), and actions (e.g., uploading selective frames). The DRL agent learns from trial and error by determining AoI 402, observing the outcomes, and adjusting its policy to maximize the cumulative reward (such as user MR experience) over time.

In embodiments, the user-centric adaptive object detection system 100 may transmit the reduced-size frame 403 and object detection task request to the server 301 through the wireless communications 250. The server 301 may feed the object detection module 322 with the task requirement in the objection detection task request and the reduced-size frame 403. The object detection module 322 may perform the object detection using one or more object detection models, such as, without limitation, You Only Look Once (YOLO), Single Shot Multbox Detector (SSD), Region-based Convolutional Neural Networks (R-CNN) to detect the objects within each reduced-size frame 403. In some embodiments, the object detection module 322 may personalize the object detection based on the request information, such as the user's preference, and past object detection, such as the historical object detection data 327, and historical user preference data 337. In some embodiments, the object detection module 322 may further conduct non-maximum suppression to eliminate redundant overlapping boxes and apply a confidence score threshold to filter out low-confidence detections. The object detection module 322 may generate object outputs 405, such as, without limitation, bounding boxes 415 (e.g., coordinates of polygons around detected objects), class labels (e.g., type of the object), and confidence scores for each detected object. For example, an object output may include detection data associated with an identified object, such as [{"Boxes": [coordinate point 1, coordinate point 2, coordinate point 3, coordinate point 4], "Confidence": [a value between 0 and 1], "Classes": "object type"}].

In some embodiments, upon object detection, the server 301 may further retrieve object information 425 related to the detected objects from the object information data 347, other databases, or the Internet. The retrieved object information 425 may be included in the object outputs 405 to be sent to the reality devices 201 and/or the ego vehicle 101. For example, in one embodiment, the server 301 may recognize the object as a building that may be of interest to the user based on the user reference data. The server 301 may then retrieve relevant data of the building to be included in the object outputs associated with the building. In another embodiment, the server 301 may recognize the object as a vehicle with a plate number. The server 301 may search the plate number from a vehicle database and retrieve public information regarding the driver of the vehicle, such as, whether the driver has any traffic violations, and further to determine whether to include a warning in the object output associated with the vehicle.

In some embodiments, after the server 301 performs the requested object detection tasks, with optional detected objects information search and retrieval, the server 301 may select generated object detection data 407 to send to the one or more reality devices 201. The selected object detection data 407 may include the bounding boxes, the class labels, the confidence scores, and the retrieved object information associated with the detected objects in the corresponding reduced-size frame 403. The selected object detection data may exclude the received reduced-size frame 403, whose file sizes are usually high in volume. The server 301 may then send the object detection data to the reality devices 201 and/or the ego vehicle 101 via the wireless communication 250.

Still referring to FIGS. 4A and 4B, in some embodiments, after receiving the object detection data, the reality devices 201 may superimpose the object detection data onto a real-world view 409 of the user. The object detection data may be rendered onto only the interested objects included in the AoI 402 in the frame 401. For example, as the AoI 402 includes a truck, the rendering device 124 may render the bounding boxes 415 of the truck and the retrieved object information 425 of the truck onto the glasses 122 to blend the information into the user's real-world view 409 in real time.

In some embodiments, after receiving the object detection data, the ego vehicle 101 may be autonomously driven based on the object detection data. The user-centric adaptive object detection system 100 may create a real-time map of the environment 105 and implement a path planning algorithm to determine a desirable route or vehicle operation. The user-centric adaptive object detection system 100 may further control the steering, throttle, and braking system of the ego vehicle 101 and monitor the ego vehicle 101

Referring back to FIGS. 1-4B, in embodiments, the computation offloading module 222 and the eye/head tracking module 242 may include one or more neural networks to train one or more AI algorithms within to determine the AoI 402 in the frame 401. The neural networks may include an encoder or/and a decoder conjunct with a layer normalization operation or/and an activation function operation. The encoded input data may be normalized and weighted through the activation function before being fed to the hidden layers. The hidden layers may generate a representation of the input data at a bottleneck layer. After delivering neural-network processed data to the final layer of the neural network, a global layer normalization may be conducted to normalize the output, such as predicted driver reaction time. The outputs may be normalized and converted using an activation function for training and verification purposes, as described in detail further below. The activation function may be linear or nonlinear. The activation function may be, without limitation, a Sigmoid function, a Softmax function, a hyperbolic tangent function (Tanh), or a rectified linear unit (ReLU). The neural networks may feed the encoder with historical area of interest data 227 and historical eye/head tracking data 237. The one or more neural networks may use regression techniques as described herein. The labeled user data may be fed to the neural network to train the computation offloading module 222 and the eye/head tracking module 242 to optimize the frame selection and transmission.

Referring to FIG. 5, a sequence diagram for performing cropping frame transmission in MR usage is depicted. At block 501, a user 500 may wear the reality devices 201, such as the virtual head unit 120, while driving the ego vehicle 101 and looking around or moving their head in a different direction. At block 503, the reality devices 201 may use head/eye tracking technology and perform movement tracking by capturing and processing the user's eye-tracking data and head-tracking data. At block 505, the reality devices 201 may interpret the collected head-tracking data and eye-tracking data to determine where the user is looking and/or what interests the user is looking. At block 507, the user-centric adaptive object detection system 100 may make off-loading decisions. The system may determine that the user is focusing on a specific area or object, and the reality devices may decide to offload the object detection task to the edge server for that particular area or object. At block 511, the reality devices 201 may transmit desirable data to the server 301 based on the direction of the user's gaze or area of interest. At block 513, the server 301 may perform object detection on the specific area or object that the user is focusing on and generate object detection data. At block 515, the server 301 may send object detection data (e.g., bounding box info) back to the reality devices 201. At block 517, the reality devices 201 may render an MR environment with real-time object detection to the user 500. For example, the reality devices, upon receiving the results from the edge server, may integrate the results into the MR view of the user. The MR view may include adjusted MR output having highlighted detected object or area. In embodiments, the reality devices 201 and the server 301 may perform continuous data exchange during user interaction. While FIG. 5 depicts performing object detection tasks, other tasks may be requested by the ego vehicle 101 and/or the reality devices 201, and performed by the server 301.

Figure 6:
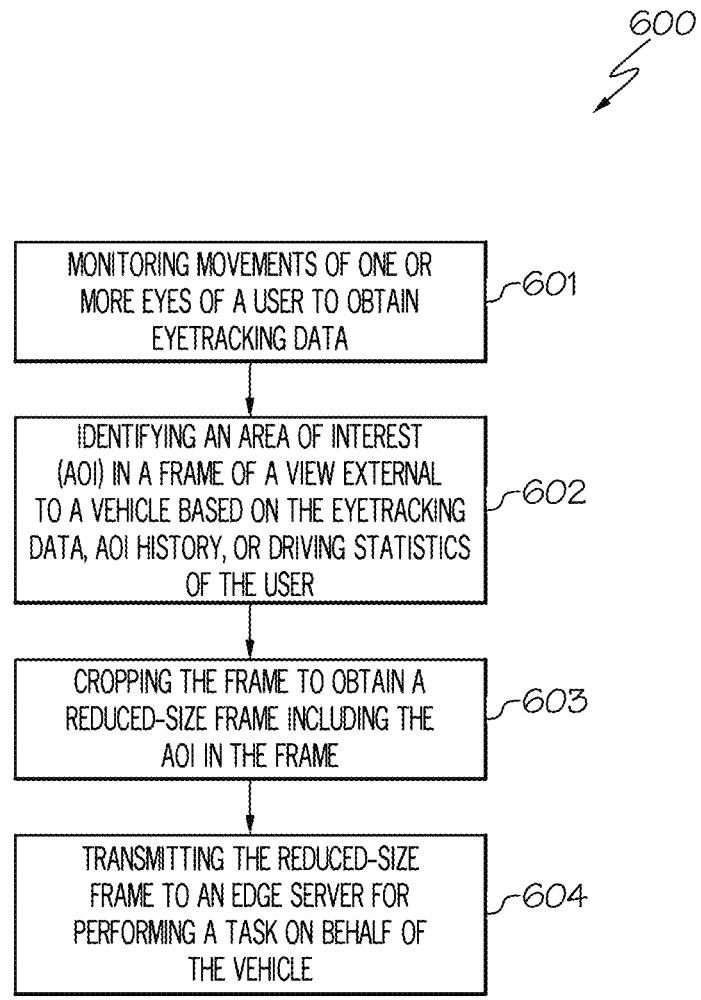
FIG. 6 depicts a flowchart for performing cropped frame transmission in MR usage of the present disclosure, according to one or more embodiments shown and described herein.

Referring to FIG. 6, a flowchart for illustrative steps for the method 600 for reducing latency and bandwidth usage of the present disclosure is depicted. At block 601, the present method 600 may include monitoring movements of one or more eyes of a user to obtain eye-tracking data using a reality device 201. At block 602, the present method 600 may include identifying an AoI 402 in a frame 401 of a view external to the ego vehicle 101 based on the eye-tracking data, AoI history (e.g., historical area of interest 227 stored in data storage component 207 of the reality devices 201 as in FIG. 2), or driving statistics of the user. The frame 401 may be captured by the reality device 201. At block 603, the present method 600 may include cropping the frame 401 to obtain a reduced-size frame 403 including the AoI 402 in the frame 401. At block 604, the present method 600 may include transmitting the reduced-size frame 403 to the server 301, such as an edge server, for performing a task on behalf of the ego vehicle 101.

In some embodiments, the user eye movement may include positions, angles, or pupil sizes of the one or more eyes of the user. The reality device 201 may include an eye-tracking sensor 208a operable to track the movements of the one or more eyes of the user and generate the eye-tracking data. The eye-tracking sensor 208a may include an infrared laser source operable to illuminate the user eyes and an eye camera operable to capture the eye-tracking data.

In some embodiments, the eye-tracking data may include user focus points, gaze fixations of each corresponding focus point, saccades between gaze fixations, scan paths of gaze fixations and saccades, and pupil dilation. The identification of the AoI 402 in the frame 401 may be based on gaze-based interaction with virtual objects. The gaze-based interaction may include duration and frequency of gaze to the virtual objects.

In some embodiments, the step of identifying the AoI based on driving statistics of the user of the present method 600 may include collecting driving sensory data to determine driving events, and correlating the user eye movement with the driving events to identify the AoI 402 in the frame.

In some embodiments, the present method 600 may further include receiving object detection data from the server 301. The object detection data may include box cords of detected objects in the frame 401, confidence of each corresponding box cord, and object information of each detected object. The present method 600 may further include autonomously driving the vehicle based on the object detection data. The present method 600 may further include superimposing the object detection data onto a real-world view.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for reducing latency and bandwidth usage comprising:
   a reality device comprising a camera to operably capture a frame of a view external to a vehicle; and
   one or more processors operable to:
      monitor movements of one or more eyes of a user to obtain eye-tracking data using the reality device;
      identify an area of interest (AoI) in the frame based on the eye-tracking data, AoI history, or driving statistics of the user;
      crop the frame to obtain a reduced-size frame including the AoI in the frame; and
      transmit the reduced-size frame to an edge server for performing a task on behalf of the vehicle.

2. The system of claim 1, wherein the movements of the one or more eyes comprise positions, angles, or pupil sizes of the one or more eyes of the user.

3. The system of claim 1, wherein the reality device further comprises an eye-tracking sensor operable to track the movements of the one or more eyes of the user and generate the eye-tracking data.

4. The system of claim 3, wherein the eye-tracking sensor comprises an infrared laser source operable to illuminate the one or more eyes of the user and an eye camera operable to capture the eye-tracking data.

5. The system of claim 1, wherein the eye-tracking data comprise user focus points, gaze fixations of each corresponding focus point, saccades between gaze fixations, scan paths of gaze fixations and saccades, and pupil dilation.

6. The system of claim 5, wherein the identification of the AoI in the frame is based on gaze-based interaction with virtual objects, wherein the gaze-based interaction comprises duration and frequency of gaze to the virtual objects.

7. The system of claim 1, wherein identifying the AoI based on driving statistics of the user comprises:
collecting driving sensory data to determine driving events; and
correlating the movements of the one or more eyes with the driving events to identify the AoI in the frame.

8. The system of claim 1, wherein the one or more processors are operable to further receive object detection data from the edge server, wherein the object detection data comprises box cords of detected objects in the frame, confidence of each corresponding box cord, and object information of each detected object.

9. The system of claim 8, wherein the one or more processors are further operable to autonomously drive the vehicle based on the object detection data.

10. The system of claim 8, wherein the one or more processors are further operable to superimpose the object detection data onto a real-world view.

11. The system of claim 10, wherein the object detection data are superimposed onto a vision of the user or a current real-world frame.

12. A method for reducing latency and bandwidth usage comprising:
monitoring movements of one or more eyes of a user to obtain eye-tracking data using a reality device;
identifying an area of interest (AoI) in a frame of a view external to a vehicle based on the eye-tracking data, AoI history, or driving statistics of the user, wherein the frame is captured by the reality device;
cropping the frame to obtain a reduced-size frame including the AoI in the frame; and
transmitting the reduced-size frame to an edge server for performing a task on behalf of the vehicle.

13. The method of claim 12, wherein the movements of the one or more eyes comprise positions, angles, or pupil sizes of the one or more eyes of the user.

14. The method of claim 12, wherein the reality device comprises an eye-tracking sensor operable to track the movements of the one or more eyes of the user and generate the eye-tracking data, the eye-tracking sensor comprising an infrared laser source operable to illuminate the one or more eyes of the user and an eye camera operable to capture the eye-tracking data.

15. The method of claim 12, wherein the eye-tracking data comprise user focus points, gaze fixations of each corresponding focus point, saccades between gaze fixations, scan paths of gaze fixations and saccades, and pupil dilation.

16. The method of claim 15, wherein the identification of the AoI in the frame is based on gaze-based interaction with virtual objects, wherein the gaze-based interaction comprises duration and frequency of gaze to the virtual objects.

17. The method of claim 12, wherein identifying the AoI based on driving statistics of the user comprises:
collecting driving sensory data to determine driving events; and
correlating the movements of the one or more eyes with the driving events to identify the AoI in the frame.

18. The method of claim 12, wherein the method further comprises receiving object detection data from the edge server, wherein the object detection data comprises box cords of detected objects in the frame, confidence of each corresponding box cord, and object information of each detected object.

19. The method of claim 18, wherein the method further comprises autonomously driving the vehicle based on the object detection data.

20. The method of claim 18, wherein the method further comprises superimposing the object detection data onto a real-world view.

* * * * *

UNITED STATES PATENT AND TRADEMARK OFFICE
CERTIFICATE OF CORRECTION

| | |
|---|---|
| PATENT NO. | : 12,387,489 B2 |
| APPLICATION NO. | : 18/809564 |
| DATED | : August 12, 2025 |
| INVENTOR(S) | : Daniel Doe, Dawei Chen and Kyungtae Han |

Page 1 of 1

It is certified that error appears in the above-identified patent and that said Letters Patent is hereby corrected as shown below:

In the Specification

In Column 2, Line(s) 4, delete "herewith" and insert --herein--, therefor.

In Column 2, Line(s) 14, after "herein", insert --;--, therefor.

In Column 11, Line(s) 20, delete "retangles" and insert --rectangles--, therefor.

In Column 14, Line(s) 45, delete "in embodiments" and insert --in some embodiments--, therefor.

In Column 16, Line(s) 16, delete "cords" and insert --coords--, therefor.

In Column 16, Line(s) 18, delete "cord" and insert --coord--, therefor.

In the Claims

In Column 17, Line(s) 18, Claim 8, delete "cords" and insert --coords--, therefor.

In Column 17, Line(s) 19, Claim 8, delete "cord" and insert --coord--, therefor.

In Column 18, Line(s) 30, Claim 18, delete "cords" and insert --coords--, therefor.

In Column 18, Line(s) 31, Claim 18, delete "cord" and insert --coord--, therefor.

Signed and Sealed this
Fourteenth Day of October, 2025

John A. Squires
*Director of the United States Patent and Trademark Office*